(12) United States Patent
Sauvebois

(10) Patent No.: US 8,271,391 B2
(45) Date of Patent: Sep. 18, 2012

(54) METHOD FOR SECURING AN ON-LINE TRANSACTION

(75) Inventor: Jean-Paul Sauvebois, Meudon (FR)

(73) Assignee: Gemalto SA, Meudon (FR)

( * ) Notice: Subject to any disclaimer, the term of this patent is extended or adjusted under 35 U.S.C. 154(b) by 980 days.

(21) Appl. No.: 10/516,136

(22) PCT Filed: May 14, 2003

(86) PCT No.: PCT/FR03/01460
§ 371 (c)(1),
(2), (4) Date: Jul. 5, 2005

(87) PCT Pub. No.: WO03/102882
PCT Pub. Date: Dec. 11, 2003

(65) Prior Publication Data
US 2006/0026440 A1 Feb. 2, 2006

(30) Foreign Application Priority Data
May 31, 2002 (FR) ...................................... 02 06760

(51) Int. Cl.
 *G06Q 20/00* (2012.01)
(52) U.S. Cl. ................ 705/64; 705/67; 705/43; 705/35; 705/74; 705/39; 705/75; 705/44; 705/73; 709/213; 713/182; 713/185; 713/193

(58) Field of Classification Search .................... 713/185
See application file for complete search history.

(56) References Cited

U.S. PATENT DOCUMENTS

| 5,903,721 | A | 5/1999 | Sixtus | |
|---|---|---|---|---|
| 6,811,082 | B2* | 11/2004 | Wong | 235/451 |
| 2002/0129248 | A1* | 9/2002 | Wheeler et al. | 713/170 |
| 2003/0046573 | A1* | 3/2003 | Bender et al. | 713/200 |
| 2003/0212896 | A1* | 11/2003 | Kisliakov | 713/193 |
| 2004/0044739 | A1* | 3/2004 | Ziegler | 709/213 |
| 2005/0033688 | A1* | 2/2005 | Peart et al. | 705/39 |

FOREIGN PATENT DOCUMENTS

| EP | 0 427 465 A2 | 5/1991 |
|---|---|---|
| EP | 0 773 647 A2 | 5/1997 |
| EP | 1 026 644 A1 | 8/2000 |
| GB | 2 261 538 A | 5/1993 |

OTHER PUBLICATIONS

International Search Report dated Sep. 26, 2003.

* cited by examiner

*Primary Examiner* — Nathan Flynn
*Assistant Examiner* — Bryan Wright
(74) *Attorney, Agent, or Firm* — Osha Liang LLP

(57) ABSTRACT

The invention relates to a method for securing an on-line transaction, comprising a proximity test which permits the proximity of the physical presence of the client to the on-line processing station (PT) with the authentication authority (AA) to be verified, an authentication test for the holder of the chipcard (CP) and a non-repudiation test for the transaction.

8 Claims, 4 Drawing Sheets

METHOD FOR SECURING AN ON-LINE TRANSACTION

This invention relates to a method for securing a commercial transaction conducted on line by a client using a chipcard.

A general application for the method concerns securing data exchanges, and more particularly in the electronic commerce domain, when the client uses a personal computer communicating on-line, via Internet, with a merchant site.

The expansion of electronic commerce calls for a high level of security for electronic payments. It is necessary in particular to ensure:

an authentication process guaranteeing the identity of the two parties;

the integrity of the information transmitted at the time of the transaction and of the payment;

the confidentiality of the information exchanged;

the non-repudiation to avoid any dispute concerning the transaction or the payment.

Solutions have been devised for securing electronic payments, such as the C-SET system proposed by the leading players in the chipcard field such as Visa, Mastercard, American Express and JCB, associating the SET protocol with the chipcard (for example, refer to the document "Integrated Circuit Card Specification for Payment System, EMV2000 version 4.0, annex D, Transaction Processing for Chip Electronic Commerce").

In general terms, the security of transactions conducted using a chipcard is based on verification of the authenticity of the chipcard holder, by means of an electronic signature comprising entry of a password, still referred to as the authentication code or PIN (Personal Identification Number) code, this being known only to the client and the authentication authority.

Entry of the PIN code via the keyboard of a processing station, for example a personal computer connected to a chipcard reader, presents risks.

Entry via the keyboard exposes the PIN code to visual capture. Furthermore, processing of the PIN code by the computer exposes the PIN code to local or remote spying, when swindlers have access to the computer via Internet.

For example, spy programs, resident in the computer, record web pages and keyboard entries on each session. This information is transmitted discretely in the form of a mail attachment, to the swindlers. Analysis of these documents then enables the swindler to find the PIN code and other financial information concerning the user, such as the user's name, address, card number, etc.

Local agents can also impersonate the chipcard holder, to conduct a transaction unknown to the chipcard holder and at the latter's expense, from the computer.

Another form of fraud is where a swindler obtains remote control of the computer. The swindler sees the screen and uses the keyboard. The remote swindler can replace the local agent, and can also execute successful form recognition tests. The swindler can intervene during a genuine transaction, to modify the terms of the transaction and have the legitimate user sign in his place, etc.

Likewise, transit of the PIN code via the cable connecting the computer to the reader, and entry of the code in the reader also represents a risk of illicit capture, thus enabling a swindler to conduct transactions in place of a careless user who has left his card in the reader, or intervene in a legitimate transaction for the purpose of changing the terms of the transaction, such as the amount or beneficiary.

We are familiar with secure readers with integrated keyboard, which make it possible to secure entry of the PIN code, in particular by avoiding the PIN code having to transit via the terminal.

However, secure readers of this type have the disadvantage of high cost.

This invention overcomes this disadvantage, providing a solution which can be installed in a non-secured environment of the personal computer type, the deployment of which is simple and cheap, while ensuring a satisfactory degree of security.

The invention concerns a process for securing a transaction, conducted on line by a client using a chipcard, said client being able to use a processing station able to communicate on line with an authentication authority, and equipped with a man/machine interface such as a screen and a chipcard reader.

According to a general definition of the invention, the process comprises the following steps:

a) an image file is loaded in the chipcard, containing a number of elements capable of forming a graphic keyboard on the processing station screen for entering an authentication code, each element of the graphic keyboard being identified by corresponding coordinates;

b) the image file is loaded from the chipcard to the processing station, to display said graphic keyboard on said screen;

c) at least one element of said graphic keyboard so displayed is selected by the client for the purpose of entering said authentication code;

d) the coordinates corresponding to the graphic keyboard element selected by the client are transmitted to the chipcard;

e) the coordinates of the authentication code deduced from the coordinates of the graphic keyboard element so transmitted, are compared with those of the authentication code of the client loaded in the chipcard;

f) if this comparison is positive, a certificate comprising a word associated with the result of the comparison, an identifier and a challenge linking the result to the current transaction is encrypted in the chipcard, and said encrypted certificate is sent to the authentication authority; and g) the certificate thus transmitted is deencrypted by the authentication authority, to check the authenticity of the chipcard holder and, provided the authentication is positive, to authorize the transaction.

The authenticity of the chipcard holder is thus verified by entering the authentication code on a graphic keyboard generated, using a process set up between the authentication authority and the chipcard. A process of this type has the advantage of using the processing station screen without requiring the addition of another screen, and of operating in a non-secured environment (personal computer) which nevertheless protects the confidentiality of the chipcard holder against local and remote attacks as mentioned above.

According to another aspect of the invention, the process also incorporates a proximity test designed to verify the physical presence of the client in the immediate vicinity of the processing station during the on-line transaction.

Thus, the fact that the client conducting the transaction is indeed a person physically in the immediate vicinity of his screen, and physically in possession of the chipcard is also secured.

This test consequently represents another efficient countermeasure against remote spying on a transaction.

The proximity test essentially involves entry by the client of information communicated to the client directly by the chipcard, or via the chipcard reader.

Preferably, the proximity test comprises the following steps:
the chipcard reader is equipped with means to distribute visual and/or audio information under the control of the chipcard;
the chipcard controls the distribution of a selected set of visual and/or audio information;
in response to the distribution of the set of information, the man/machine interface of the processing station is used selectively by the client to transmit a set of information to the chipcard in reply to the set of information sent by the chipcard;
the set of information generated by the client is received by the chipcard, and compared with the set of information generated by the chipcard; and
the transaction is authorized if the comparison is positive.

In practice, this proximity test can be conducted at any time, namely before, during and/or after the transaction.

According to another aspect of the invention, it is appropriate to verify that the client pays the correct amount to the legitimate merchant, and that the client cannot subsequently refuse the transaction proper. It is also appropriate to avoid any substitution of elements of this transaction by a hacker, in favour of another transaction conducted by said hacker.

The invention also provides for a transaction non-repudiation procedure for this purpose.

In practice, the non-repudiation procedure comprises the following steps:
financial information relating to the transaction is stored in an image file by the authentication authority;
said image file linked to the transaction is sent to the chipcard via the processing station and the chipcard reader;
said image file is loaded from the chipcard to said processing station for display on the screen;
at least one item of financial information in said image file so displayed is selected by the client;
the corresponding coordinates of said financial information selected by the client are sent to the chipcard;
a message is encrypted in the chipcard, comprising at least said financial information concerning the transaction thus deduced, and said encrypted message is sent to the authentication authority; and
the authentication authority decrypts the message sent, verifies the associated financial information and validates the transaction if the verification is positive.

This invention is also designed to provide a device for implementation of the process according to the invention.

This invention also concerns a computer program which can be run in a computer to provide the technical functions of the process according to the invention.

Other characteristics and advantages of the invention will appear from the detailed description of a non-restrictive method of implementation of the invention, referring to the attached figures where:

The example selected to illustrate this invention concerns an electronic transaction application conducted on Internet.

Obviously, the invention is not limited to this one application, and concerns, in more general terms, all secured applications involving a chipcard.

Figure 1:
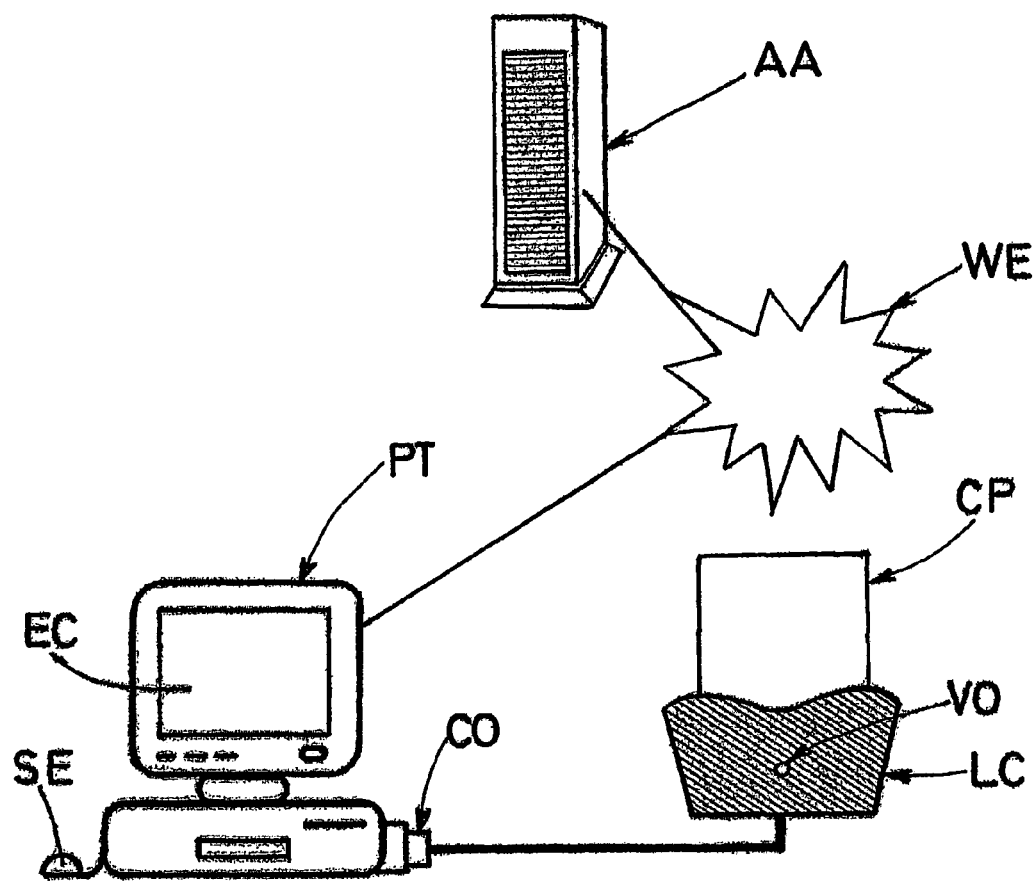
FIG. 1 is a schematic view of the devices involved in execution of a transaction in accordance with the invention.

For preference, according to FIG. 1, the objective is to conduct an electronic transaction between a user and a merchant site in complete security.

The user is placed in front of a processing station PT, this being the user's personal computer for example.

This computer PT is connected to Internet WE, and can thus access a merchant web site (not shown) associated with an authentication authority AA.

Having decided to acquire an article via the merchant site, the chipcard holder issues a purchase order, communicating the identification data required by the supplier, including details of his bank card in particular.

For this purpose, the chipcard holder enters the data on the keyboard of his computer PT, which are then transmitted via Internet to the merchant site.

The communication between the merchant site and the authentication authority AA is conducted in accordance with the protocol in force on the merchant site.

For example, the "3D secure" protocol developed by Visa can be employed.

When the communication is secured, as with the "3D secure" protocol, the identity and authenticity of the user must be guaranteed.

For this purpose, the user must send encrypted certificates, based on known encryption methods, whether of the symmetrical or secret key (DES) type, or asymmetrical or public key (RSA) type.

To guarantee the identity and authenticity of the user, these encrypted certificates employ software and keys possessed by the user alone.

This secret information cannot be loaded in the computer PT, all the resources of which are easily accessible, in particular by spy software and other computer viruses.

These secret data are therefore stored for preference, and with total inviolatability, in the electronic circuit of a chipcard CP, and in this case the user's conventional bank card, or a dedicated bank card for purchasing via Internet.

The user therefore has an electronic chip bank card CP, obtained from an appropriate financial establishment.

This card is inserted in a chipcard reader LC, connected to the computer PT, enabling the latter to access the software resources of the chipcard CP.

The computer PT is equipped with an appropriate software of the bank terminal emulation type, and can consequently send an authentication or integrity certificate to the merchant site, this certificate then being forwarded by the merchant site to an authentication authority AA (bank server), to obtain bank authorization for acceptance of the transaction.

As software access to the chipcard triggers transmission of encrypted certificates, prior presentation of a secret code (or authentication code) stored by the user and referred to as the PIN code, is required.

The chipcard CP is a standard object as defined in standards ISO 7810, 7816 and 14443 in particular, the content of which is integrated in this document by reference.

The chipcard according to the invention is able to communicate with the outside world, for example the computer PT, via the contacts of chipcard CP.

These are contact VCC in particular, which provides the power supply voltage for the chipcard, contact GND used to ground the chipcard, and contacts D+ and D− for bidirectional data transmission.

Where data transmission is via contacts D+ and D−, the format of these data, and the protocol used, are as defined in standard USB.

The USB interface of the chipcard decrypts the data transmitted via contacts G+ and G−, reformatting these data so that they can be generated and managed by the chipcard CP, or more precisely by the central processor unit of the card.

USB transmission between the chipcard CP and the chipcard reader LC, and between the chipcard reader LC and the computer PT, have the advantage of being both rapid and synchronous in the half-duplex mode, eliminating the need for transmitting a clock signal via the clock contact.

The I/O (input/output) contact is thus free, and can be used to send the PIN code.

In practice, the chipcard reader LC according to the invention is designed to receive the chipcard CP for connection with a USB protocol.

It comprises a case in which the chipcard CP is inserted, and a cable equipped with a USB plug for connection of the reader to the corresponding USB port of the computer PT.

The case has a recess provided for at least partial insertion of the chipcard CP.

The recess incorporating the chipcard reader LC has devices for connection with the flush contact pads of the chipcard CP.

These connection devices have five pins, four of which correspond to the USB pads of chipcard CP, namely D+, D−, VCC and GND, and one input/output pin.

This input/output pin is connected to an appropriate circuit VO, internal to the chipcard reader LC.

This circuit VO is, for example, the power supply circuit of a light-emitting diode (LED), mounted on the chipcard reader LC in a position visible to the user.

As a variant, this circuit VO can be an audio and/or visual information transmission circuit.

Thanks to this circuit VO and to the distribution of corresponding information, the chipcard CP is able to communicate data in visual form to the user, without the computer connected to reader LC being able to see this data.

As will be seen in more detail below, circuit VO participates in the proximity test defined above.

For example, the processing station PT comprises selection devices SE, capable of selecting part of screen EC, and a mouse or a touch pen or analog pen.

According to the invention, the authentication authority AA comprises generator devices capable of generating at least a program, the latter being capable in turn of generating an image file (for example in bitmap form) on screen EC.

In practice, the image file incorporates at least a number of elements capable of forming a graphic keyboard on screen EC for entry of an authentication code.

Each element of the bitmap image file is identified by corresponding coordinates, for example X and Y coordinates, on screen EC.

The image file elements can comprise elements belonging to the group formed by design representation, graphic representations, simple or complex alphanumeric representations, icons, images, combinations of graphic and alphanumeric representations, or graphic representations modified according to the countermeasures adopted.

It is extremely easy for a user to remember a design combination, rather than an arbitrary combination of letters and digits which is very difficult to memorize.

Conversely, it is extremely difficult for potential hackers, for whom existing IT tools provide very limited assistance, to identify texts and designs selected by the user from graphic representations.

The authentication process described below in more detail employs conceptual representation of this type to advantage, although not restrictively.

Figure 2:
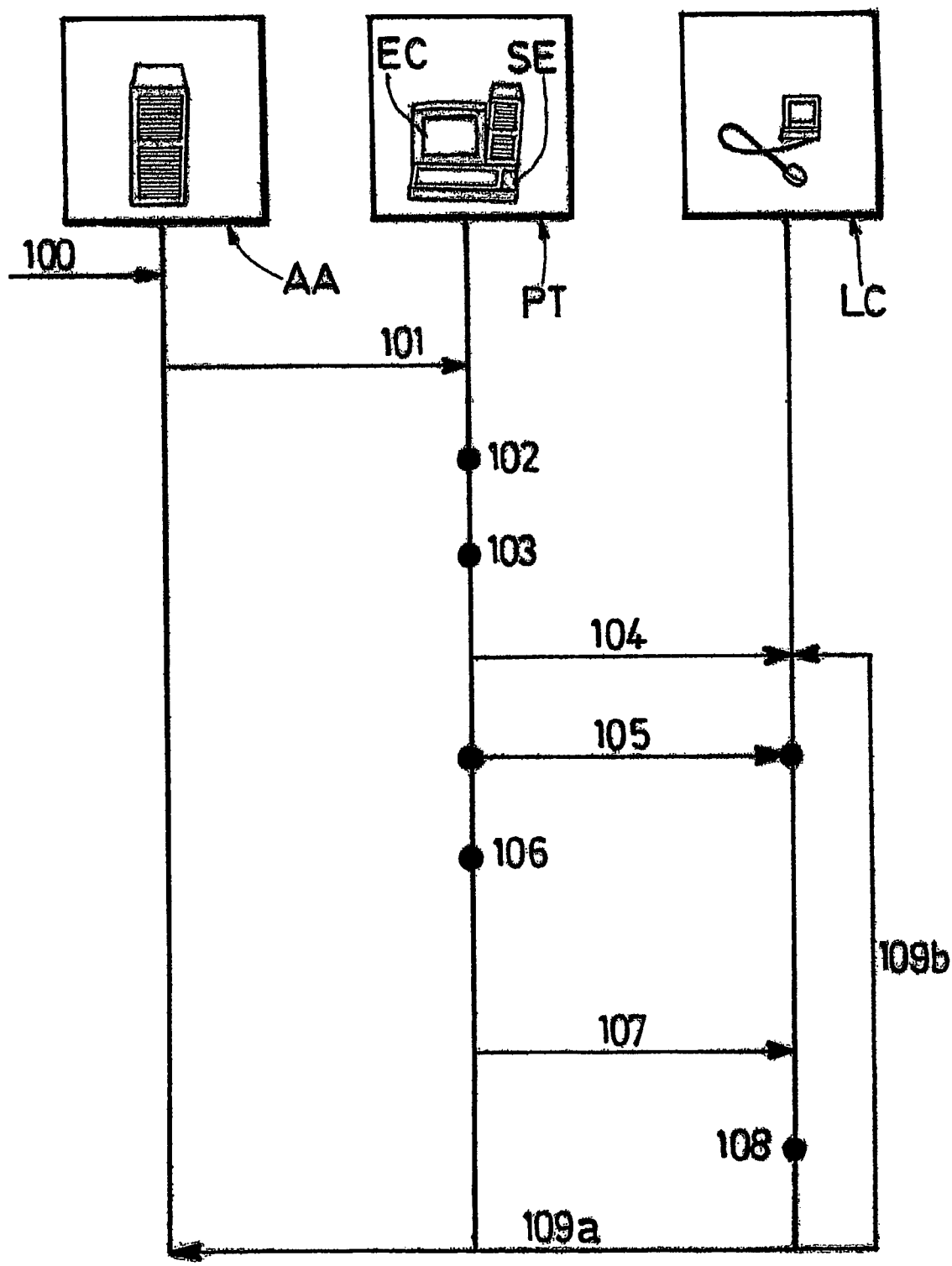
FIG. 2 illustrates the steps of the proximity test according to the invention.
Figure 3:
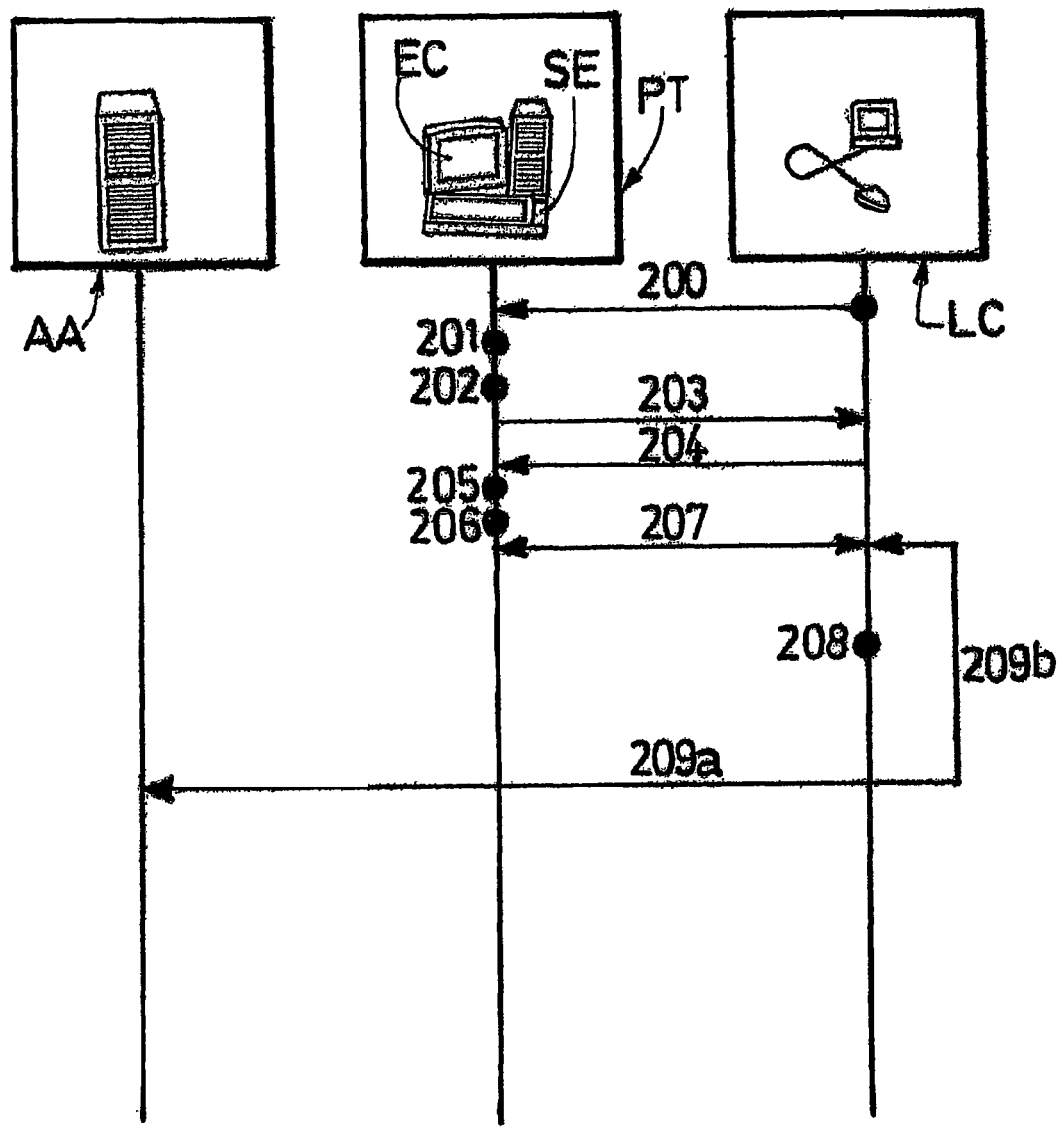
FIG. 3 illustrates the steps in the authentication process for the chipcard holder according to the invention.
Figure 4:
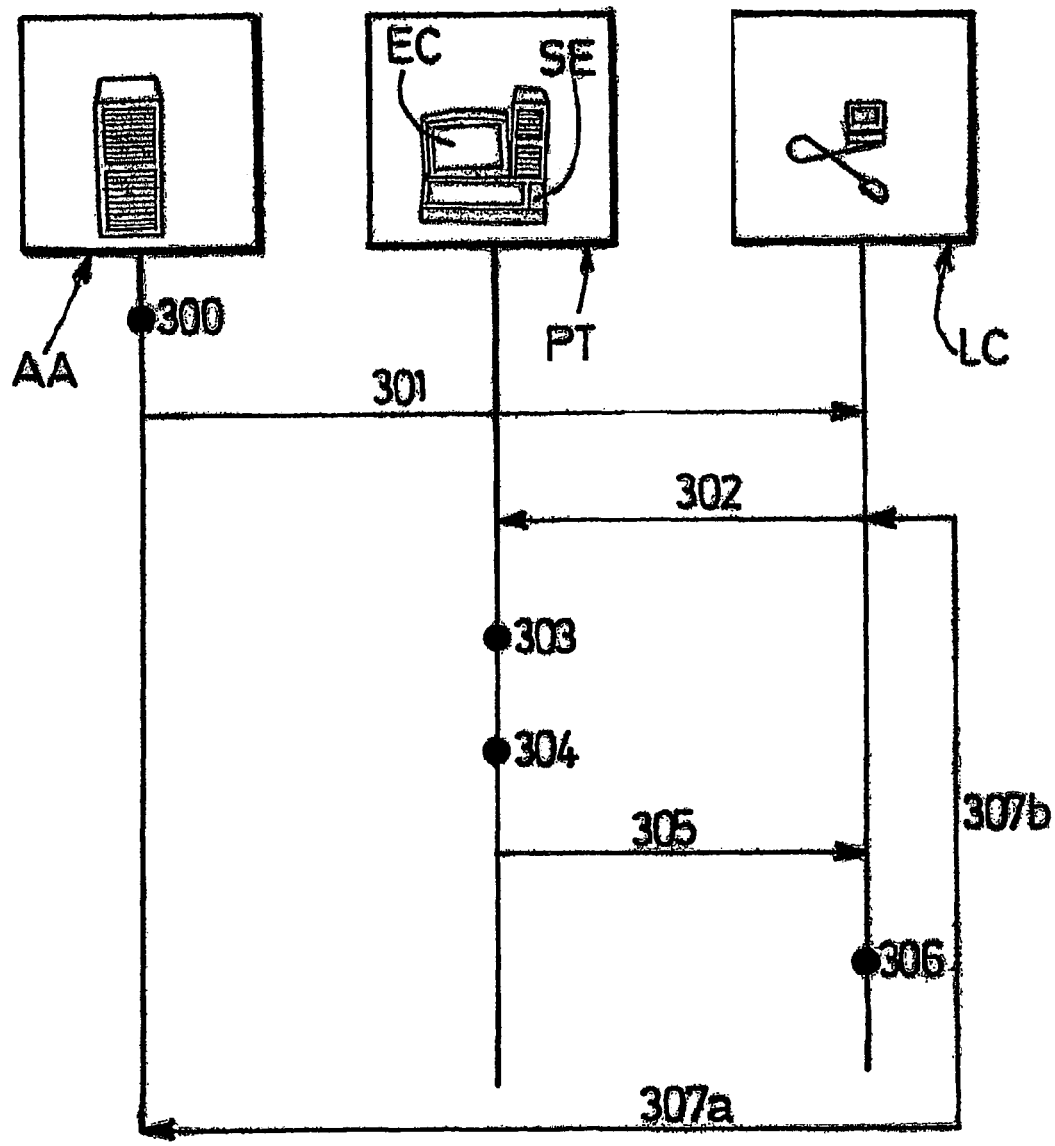
FIG. 4 illustrates the steps of the non-repudiation test on the transaction according to the invention.

The sequence of steps in the authentication process according to the invention is described below, referring to FIGS. 2 to 4.

The proximity test is executed first (FIG. 2):

Step 100: the authentication authority AA receives an authentication request from the merchant site (not shown) via a secure protocol of the "3D secure" type for example.

Step 101: the authentication authority AA sends a program to the processing station PT.

This program comprises, in encrypted form (namely encrypted using a public key in the case of a cryptographic function of the RSA type), the number of light flashes sent by circuit VO, a challenge and other information which will be described in more detail below.

Step 102: the processing station PT displays a message for the user on screen EC.

This message can take the following form: "you have to execute a proximity test. Please insert your chipcard and react to each flash from the chipcard reader by clicking the red circle. Click OK when you are ready to begin".

Step 103: the user clicks OK.

Step 104: the processing station PT sends an APDU applet to the chipcard reader LC, comprising an encrypted message containing the number of light flashes and a challenge from the authentication authority.

Step 105: chipcard CP and the user exchange information in question/answer form via the chipcard reader LC and the processing station PT. For example, the chipcard CP can send visual and/or audio information displayed or distributed on circuit VO.

For example, this information corresponds to the visual flashes (number and duration) specified by the authentication authority.

Step 106: the user clicks on screen EC of the processing station PT. The number of exchanges is determined in advance (number and duration of the light flashes).

Step 107: the processing station PT sends a reply to the visual signals distributed by circuit VO to chipcard CP. This reply comprises keyboard or mouse SE information, sent by the user in reply to the random series (number and duration) of light flash pulses, for example.

Step 108: the information generated by the client on screen EC is compared with the set of information awaited by chipcard CP (number and duration of flashes).

In practice, the time envelope for the light signals from circuit VO, and that reconstituted by processing the messages sent by the processing station PT, are correlated by chipcard CP.

If the two envelopes can be superimposed, the chipcard knows that the user has seen chipcard CP.

Step 109a: if the comparison is positive, the test is considered successful, and the subsequent transaction operations can be conducted.

Step 109b: if the comparison is negative, the procedure is restarted at step 100.

Provision can be made for chipcard CP to be locked after a given number of negative comparisons.

The proximity test is used to check the physical presence of the user in this way.

A variant form for execution of the proximity test involves requesting the user to react to each flash, not by clicking on a screen field, but by pressing a button which can be incorporated in the chipcard connector.

The proximity test is provided by the visual range of lamp VO of connector CO, and cannot be simulated by a remote fraudulent entity (remote control and spying via the network), or a fraudulent entity resident in computer PT. In all these cases, the swindler is virtually blind.

The secured transaction can commence or finish with, or incorporate this proximity test, and thus prohibit remote control of chipcard CP by a remote fraudulent entity, and locking of the card on presentation of three false PIN codes.

This is followed by an authentication test for the holder of chipcard CP.

Step 200: chipcard CP sends a message informing the processing station PT that the proximity test result is positive.

Step 201: if the proximity test is positive, the computer displays the following message: "proximity test successful. Please authenticate yourself. A graphic keyboard will be displayed in a moment. Please enter your password by clicking the screen with your mouse. Click OK when you are ready to start the authentication procedure".

Step 202: the user clicks OK.

Step 203: the processing station PT sends a graphic keyboard display query to the chipcard CP.

Step 204: the chipcard CP sends the graphic keyboard elements.

Step 205: the screen EC displays the graphic keyboard generated by the chipcard CP.

A graphic keyboard is thus provided for the user for entry of his authentication code.

Step 206: the user enters an authentication code, following the instructions displayed on screen EC.

The user selects at least one graphic keyboard element with his mouse SE to enter his authentication code.

Step 207: the coordinates corresponding to the authentication code selected by the user on the graphic keyboard are sent to the chipcard CP.

Step 208: in chipcard CP, the coordinates of the authentication code sent are compared with those loaded in the chipcard CP.

Step 209a: if comparison is positive, the authentication authority AA receives confirmation of authentication in message form from the chipcard CP.

When this message is sent, the chipcard CP encrypts the content of the message using its public key.

The addressee of the encrypted message, in this case the authentication authority AA, decrypts the content of the message using its private key.

Step 209b: if the comparison is negative, the procedure is restarted at step 207.

Provision can be made for chipcard CP to be locked after a given number of negative comparisons.

This can occur, for example, when the X and Y coordinates on the graphic keyboard correspond to an image indexed "4".

Only the chipcard CP knows that the image indexed "4" can correspond to numerical representation of digit 3, for example.

Only the chipcard CP has knowledge of this correspondence table, which can vary for each transaction.

When the chipcard CP receives the coordinates of the graphic keyboard and verifies that these correspond correctly to the authentication code, and if the comparison is positive, the chipcard CP signs (encrypts) the resultant message, and sends the transform of the challenge by the authentication function to the authentication authority AA, and to the server.

The server verifies (decrypts) the signature, compares the reply to the challenge, and if the verification is positive, authorizes the transaction as the chipcard holder is authentic.

If the comparison is negative, the following message can be displayed: "authentication refused. You have two more attempts".

If the user clicks "cancel", a confirmation message is displayed with the following content: "this operation will cancel your transaction. Cancel the transaction—yes or no?". If the user replies "yes", the user is redirected to the corresponding merchant site. If the user replies "no", the user receives the following message: "Click OK to attempt the authentication test again".

Furthermore, this invention provides for a transaction non-repudiation test procedure.

This option can be used to generate a new visual element, enabling the user to validate the financial information concerning his purchase.

The financial information concerning his purchase can be the name of the merchant site, the amount, the currency and the purchase order.

This information is displayed in graphic form, to ensure that it cannot be modified fraudulently, by comparison with information transmitted on the network between the merchant site and the computer which is subject to the risks mentioned above.

The transaction non-repudiation test procedure according to the invention makes it possible, in this case, to prevent subsequent repudiation of certain elements of the transaction (amount, currency, date, etc.).

The mechanism involves the authentication authority AA, which in this case calculates certificates (or signature) for said information attached to the transaction.

The chipcard CP verifies the corresponding certificates. The user must retain the elements of the transaction and the associated certificates, for using them subsequently in the event of a dispute.

In practice, the non-repudiation mechanism according to the invention involves a transaction signature (with the password or PIN code of the client), for the purpose of authenticating said client and preventing repudiation of the purchase, and a signed acknowledgement to prevent repudiation on reception of the purchase.

For example (FIG. 4), in step 300, the authentication authority stores the commercial information concerning the transaction in an image file.

This can be the amount of the transaction or the currency in which the transaction was conducted, the time and/or date at which it was conducted, the order reference, etc.

Step 301: the authentication authority AA sends the commercial information to the chipcard CP via the processing station PT and the chipcard reader LC.

Step 302: the chipcard transmits the graphic elements containing the commercial information.

Step 303: the processing station PT displays this information on screen EC.

Step 304: the user validates the information by clicking the icon or the corresponding graphic representation displayed on screen EC.

Step 305: the corresponding coordinates are transferred to the chipcard CP.

Step 306: in the chipcard CP, the coordinates transferred by the processing station are compared with those corresponding to the information received in step 301.

Step 307a: if the comparison is positive, the authentication authority AA receives confirmation from the chipcard CP.

Step 307b: if the comparison is negative, the operation is restarted at step 302.

Provision can be made for cancelling the transaction after a given number of negative comparisons.

Provision can also be made for display of a cancellation element on screen EC, which the user can click to cancel the transaction.

The user can thus confirm the transaction.

This makes it possible to restrict disputes at the time of delivery of the product ordered.

The invention claimed is:

1. A method for securing an on-line transaction conducted by a client using a chipcard, said client being able to use a processing station, said processing station being able to communicate on line with an authentication authority, said processing station being equipped with a man/machine interface such as a screen, and a chipcard reader, the chipcard reader comprising a proximity test for verifying the physical presence of the client in the immediate vicinity of the processing station, an authentication test for the holder of the chipcard, and a transaction non-repudiation test, wherein the proximity test involves entry of information by the client which is determined to be equivalent to information sent to the client by the chipcard directly or via the chipcard reader, wherein the non-repudiation test comprises the following steps:

storing commercial information relating to the on-line transaction in an image file in the authentication authority;

transmitting the image file linked to the on-line transaction to the chipcard, via the processing station and the chipcard reader, wherein the image file from the chipcard is loaded in the processing station for display on the screen;

decrypting an encrypted message received by the authentication authority; and validating the on-line transaction if verification is positive, wherein at least one item of financial information in the image file displayed on the screen is selected by the client, wherein corresponding coordinates of the financial information selected by the client are transmitted to the chipcard, and wherein a message comprising at least the financial information concerning the on-line transaction on the chipcard is encrypted to create the encrypted message and transmitted to the authentication authority.

2. The method for securing the on-line transaction according to claim 1, wherein the authentication test involves entry of a secret identification code by the client, and verification of said secret identification code by said chipcard.

3. The method according to claim 1, characterized in that the proximity test, comprises:

controlling the distribution of a selected set of visual and/or audio information by the chipcard, wherein, in response to the distribution of the selected set of visual and/or audio information, the client selectively uses the man/machine interface of the processing station, or a connector, to transmit a client selected set of information to the chipcard in reply to the selected set of visual and/or audio information sent by the chipcard;

receiving the client selected set of information generated by the client on the chipcard; and comparison of the client selected set of information with the selected set of visual and/or audio information sent by the chipcard; and if the comparison is positive, continuing with the on-line transaction.

4. A device for carrying out the method according to claim 1.

5. A non-transitory computer readable medium comprising computer program capable of being performed on a computer to implement the technical functions of the method according to claim 1.

6. A processing station, comprising:

a user interface comprising a screen and configured to receive information from a client, wherein the processing station is operatively connected to a chipcard reader and wherein the chipcard reader is configured to receive a chipcard from the client, wherein the chipcard reader is further configured to perform a proximity test to verify physical presence of the client in an immediate vicinity of the processing station, wherein performing the proximity test comprises:

displaying, by the chipcard reader, a plurality of visual signals, obtaining information entered by the client through the user interface, determining whether the information entered by the client matches the plurality of visual signals displayed by the chipcard reader, sending a message to the processing station that a proximity test result is positive when the information entered by the client matches the plurality of visual signals displayed by the chipcard reader, wherein the processing station is configured to, when the proximity test result is positive, perform an authentication test, wherein the authentication test comprises:

displaying, on the user interface, an image file comprising a number of elements for forming a graphic keyboard and wherein each element of the graphic keyboard is identifiable by a corresponding coordinate;

prompting the client to enter an authentication code on the graphic keyboard;

receiving the authentication code from the client, wherein entry of the authentication code comprises selection of at least one element of the graphic keyboard;

transmitting a coordinate corresponding with the at least one element to the chipcard;

receiving an authentication certificate from the chipcard, when the coordinate corresponding with the at least one element to the chipcard matches a pre-loaded coordinate on the chipcard, wherein the authentication certificate is used to authorize the client in an on-line transaction.

7. The process station of claim 6, wherein the authentication test further comprises:

storing commercial information relating to the on-line transaction in the image file in the authentication authority;

transmitting said image file linked to the on-line transaction to the chipcard, via the processing station and the chipcard reader;

loading said image file from the chipcard in said processing station for display on the screen;

having the client select at least one item of financial information in said image file displayed on the screen;

transmitting of corresponding coordinates of said financial information selected by the client to the chipcard;

encrypting a message comprising at least said financial information concerning the on-line transaction on the chipcard, and transmitting said encrypted message to the authentication authority;

decrypting the encrypted message received by the authentication authority; and validating the on-line transaction if verification is positive.

8. A method for securing an on-line transaction conducted by a client using a chipcard, said client being able to use a processing station, the processing station being able to communicate on line with an authentication authority, the processing station being equipped with a man/machine interface such as a screen, and a chipcard reader, the chipcard reader comprising a proximity test for verifying the physical presence of the client in the immediate vicinity of the processing station, an authentication test for the holder of the chipcard, and a transaction non-repudiation test, wherein the proximity test involves entry of information by the client which is determined to be equivalent to information sent to the client by the chipcard directly or via the chipcard reader, wherein the chipcard holder authentication test comprises:

- loading on the chipcard an image file comprising a number of elements capable of forming a graphic keyboard on the screen of the processing station for entry of an authentication code, each element of the graphic keyboard being identified by its corresponding coordinates;
- loading the image file from the chipcard in the processing station to display the graphic keyboard on screen;
- causing selection by the client of at least one element of the graphic keyboard displayed on the screen to enter the authentication code;
- transmitting to the chipcard the corresponding coordinates of the graphic keyboard selected by the client;
- comparing, in the chipcard, coordinates of the code deduced from the coordinates of the keyboard element transmitted with those of the authentication code of the client loaded in the chipcard;
- if the comparison is positive, encrypting a certificate comprising at least one word linked to the result of the comparison, an identifier, and a challenge linking the result to the current transaction on the chipcard, the encrypted certificate then being transmitted to the authentication authority, wherein the encrypted certificate is received by the authentication authority and is decrypted to verify the certificate, and wherein when the verification is positive, the transaction is authorized.

* * * * *